455/3 179/82

Sept. 11, 1951 W. S. HALSTEAD 2,567,431

COMMUNICATIONS SYSTEM OF RESTRICTED RANGE TYPE

Filed May 5, 1947 5 Sheets-Sheet 1

WILLIAM S. HALSTEAD
INVENTOR

BY Herbert Smith
ATTORNEY

COMMUNICATIONS SYSTEM OF RESTRICTED RANGE TYPE

Filed May 5, 1947 5 Sheets-Sheet 2

WILLIAM S. HALSTEAD
INVENTOR

BY [signature]
ATTORNEY

Sept. 11, 1951 W. S. HALSTEAD 2,567,431

COMMUNICATIONS SYSTEM OF RESTRICTED RANGE TYPE

Filed May 5, 1947 5 Sheets-Sheet 3

WILLIAM S. HALSTEAD
INVENTOR

BY Herbert H. Smith

ATTORNEY

Sept. 11, 1951 W. S. HALSTEAD 2,567,431

COMMUNICATIONS SYSTEM OF RESTRICTED RANGE TYPE

Filed May 5, 1947 5 Sheets-Sheet 4

WILLIAM S. HALSTEAD
INVENTOR

BY Hubert J. Smith

ATTORNEY

COMMUNICATIONS SYSTEM OF RESTRICTED RANGE TYPE

Filed May 5, 1947 5 Sheets-Sheet 5

WILLIAM S. HALSTEAD
INVENTOR

BY Herbert J. Smith
ATTORNEY

Patented Sept. 11, 1951 2,567,431

UNITED STATES PATENT OFFICE 2,567,431

COMMUNICATIONS SYSTEM OF RESTRICTED-RANGE TYPE

William S. Halstead, Purchase, N. Y.

Application May 5, 1947, Serial No. 745,926

10 Claims. (Cl. 250—9)

This invention pertains to restricted-range induction-radio communications systems and apparatus therefor, and more particularly to a system for providing individualized reception of induction radio signals within a specific seating area encompassed by a horizontal transmitting loop on which one or more radio carrier frequencies, modulated by audio-frequency signal energy, have been impressed.

The invention is related to the general subject matter of restricted-range radio communications as disclosed in my co-pending applications, now abandoned, for United States Letters Patent, Serial Numbers 570,051 for Induction Radio System and 570,052 for Radio Sound Distribution System, and the disclosures of this application are considered to be improvements thereon.

Heretofore it has been customary to utilize electronic speech amplification equipment with associated loudspeakers or headphones in distributing to listeners within the seating area of a hall, auditorium or theatre the sounds associated with the voice of a speaker, music, or other intelligence addressed to the occupants of the seating area. In some instances, as in providing for persons with deficient hearing, or in conveying several language translations of a speaker's voice at international conferences, radio carrier signals, modulated by audio frequencies derived from speech amplification equipment and associated microphones or sound records, have been impressed on a horizontal transmitting loop encompassing the seating area by means of a carrier transmitter. Through the use of portable receivers and associated headphones, listeners within the seating area have been able to hear the sounds as transmitted by the system. An arrangement of this general type is shown in my co-pending applications, Serial Nos. 570,051 and 570,052. In applications of the system in which several different language translations of a speech are transmitted concurrently within the seating area, different carrier frequencies are employed for the various language translations, as is also described in my co-pending applications, Serial Numbers 570,051 and 570,052. The listener then selects, by means of a frequency selector switch or similar device in the portable receiver, the particular translation channel to be heard.

As disclosed in the patent applications to which reference has been made in the preceding paragraphs, the portable receivers for use in this type of service have been of a type intended to be carried into the seating area by the individual listener and worn by him during listening periods.

While receivers of this general type have been successfully employed in practice, as at several conferences of the United Nations, a problem has presented itself with respect to the distribution and utilization of the portable receivers, particularly in large seating areas in which several thousand persons may desire to use the individual receiving equipment. It is apparent that at a large gathering of this size, a major problem would be involved in providing each person with a receiver, in collecting the receivers after the event, and in preventing theft of the receivers. In addition, if the receivers utilize vacuum tubes and batteries, a serious problem is presented in that each receiver must be checked prior to its use to determine that the tubes and batteries are in proper operative condition, and must again be checked after each period of use to ascertain that the battery switch in each receiver has been thrown to the "off" position by the person who has employed the unit.

A further problem has presented itself in connection with the operation of group-address system of the radio-carrier type in that interception of the signals at points outside of an auditorium area in which a conference is held may be accomplished by anyone possessing a radio receiver tuned to frequencies employed by the transmitting system. In some instances, this may be highly undesirable, especially in certain international conferences where a degree of security is to be maintained.

These and other considerations have resulted in the invention of the present application. In the system of the invention, each receiver employed by a listener in the seating area becomes a part of the chair utilized by him. A loop antenna, which is an integrated portion of the chair receiver structure, is mounted in a position for optimum signal pick-up beneath the seat of the chair, with the volume control and tuning switch located on a "tuning head" disposed at the side of the seat in a position convenient for the user. Adjustable elastic straps are employed to hold the receiver in position on the chair, thereby facilitating the attachment and removal of the chair receiver without the use of tools or mounting fixtures capable of defacing or in any way damaging the finish of the chair.

Inasmuch as the receiving means may be quickly and easily attached to any conventional type of chair, the system may be installed without difficulty in the average auditorium, theatre or other places of assembly equipped with chairs of various types. Also, as the chair receiver can readily be affixed in position by authorized personnel prior to an event, such as an international conference, and may be left in position on the chair for a series of conferences, it may be seen that no problem of receiver distribution to each listener is presented. Since the receiver is not removable by the listener after each period of use, and is in such form that it could not be readily be stolen without detection by others in the seating area, a solution to the problems of disposal of the receiver after each event and its possible theft has been found.

While a preferred form of chair receiver of the present invention is of a non-vacuum tube type, and requires no batteries, it is possible that for some applications of the system, receivers of vacuum-tube type of relatively high sensitivity may be desired. Therefore, to assure that battery power is removed from vacuum tubes at the end of each period of use, means are disclosed to enable the automatic disconnection of electric power in chair receivers of the vacuum-tube type when the listener rises from his seat at the conclusion of an event. Thus, at the end of a day's session at an international conference, for example, the batteries of the chair receiver are automatically disconnected from the vacuum tube circuits, thereby preventing the accidental discharge of the batteries through failure of the listener to turn the power switch to the "off" position.

Means are also disclosed whereby an anti-interception, or "jamming" transmitter, operating on the same or substantially the same carrier frequencies employed by the group-address transmitter, is so arranged as to preclude reception of an intelligible signal from the group-address transmitter at points outside of the seating area served by it, without causing interference with the group-address signals at points within the seating area.

It is one of the objects of this invention to provide a restricted-range induction-radio communications system and apparatus therefor wherein a signal-emanating means is disposed adjacent a seating area provided with a radio receiver individual to each of the seats therein, and with means for connecting from a central transmitting station to the radio receivers over a plurality of radio-frequency signaling channels of different carrier frequencies.

A further object of the invention is to provide a system employing a multi-channel transmitting station connected to a signal emanating means which is disposed to concentrate the transmitted signal in a localized seating area wherein one or more radio receivers are located in each chair structure and adapted for selecting the desired frequency from the multi-channel transmitter as desired by the listener at each chair.

A further object of the invention is to provide a transmitting system utilizing a multi-channel transmitter having its output connected to a signal emanating means for concentrating the transmitted signal in a specific area and having a multiplicity of modulated carrier wave transmitters, each connectable for modulating one carrier frequency of the multi-channel transmitter, and at least one radio receiver of chair type responsive to the carrier signals emitted by the multi-channel transmitter, disposed in the area of the concentrated transmitted signal, with the receiver having a switching means for selecting the particular channel desired to be utilized by the operator of the radio receiver.

A further object of the invention is to provide a restricted-range communications system wherein a multi-channel radio transmitter has its output connected to a signal-emanating means disposed adjacent a localized seating area, and having a modulating means connected to each of the input channels of the radio transmitter for simultaneously impressing upon the signal emanating means a multiplicity of modulated signals, any one of which may be selected by the operator of a radio receiver disposed within a chair structure in the seating area.

A further object of the invention is to provide a restricted-range induction-radio communications system utilizing a multi-channel frequency transmitter having its output connected to a loop-type signal emanating means disposed about a seating area wherein a speaker's voice may modulate one channel of the transmitter, said speaker's voice to be received by a multiplicity of radio receivers for the benefit of translators so that the translators may translate the received message of the speaker, and thereafter each of said translators may speak into a microphone, individual to each translator, for modulating a separate radio frequency channel of the multi-channel transmitter to the end that an occupant of a seat within the confines of the signal emanating means may select the signaling channel of the particular translator desired.

A further object of the invention is to provide a simplified form of radio receiver for use in conjunction with the system set forth herein wherein the receiver may have as an integral part thereof a horizontal loop-supporting housing, with a loop disposed therein, and means secured to the loop-supporting housing for disposing and securing the loop beneath the seat of a chair in a position for effective reception of radio-carrier signal energy from a horizontal transmitting loop disposed about the seating area in which the chair is located.

A further object of the invention is to provide a loop-structure supporting member with a loop-structure housing angularly disposable thereto for positioning the radio receiver loop to obtain maximum signal strength from the signal-emanating means of the system.

A further object of the invention is to provide a radio receiver having a loop-structure housing disposable below the seat of a chair and positionable in relation to the seat of the chair in such manner as to reduce the effect of body capacity resulting from proximity between the occupant of the chair and the loop, and in such manner as to provide maximum signal reception from the signal-emanating means of the transmitting system.

A further object of the invention is to provide a radio receiver having a loop-structure housing with means secured to the loop-structure housing for positioning and securing same to the area beneath the seat of a chair or the like.

A further object of the invention is to provide a flexible loop-structure housing having a metallic conductor as a part thereof with said loop structure housing having resilient fastening means for mounting same on the seat of a chair or the like, with the structure housing having as an integral part thereof, a radio receiver disposed at the side of the seat of the chair and within easy reach of the occupant thereof.

It is an additional object to provide a receiver, mountable on a chair, wherein electric power for operation of vacuum tubes within the receiver is automatically disconnected when the occupant of the chair rises from his seat.

It is also an additional object to provide an induction radio receiver having a minimum number of vacuum tubes to amplify and rectify an induction-radio carrier wave of specific radio carrier frequency.

It is a futher object to provide an induction radio signaling system wherein interception of intelligence addressed primarily to occupants of a designated seating area is precluded at points substantially outside the seating area.

Further and other objects may become apparent from a perusal of the disclosure herein, and it is to be understood that modifications and changes may be made without departing from the spirit of the subjoined claims.

Figure 1:
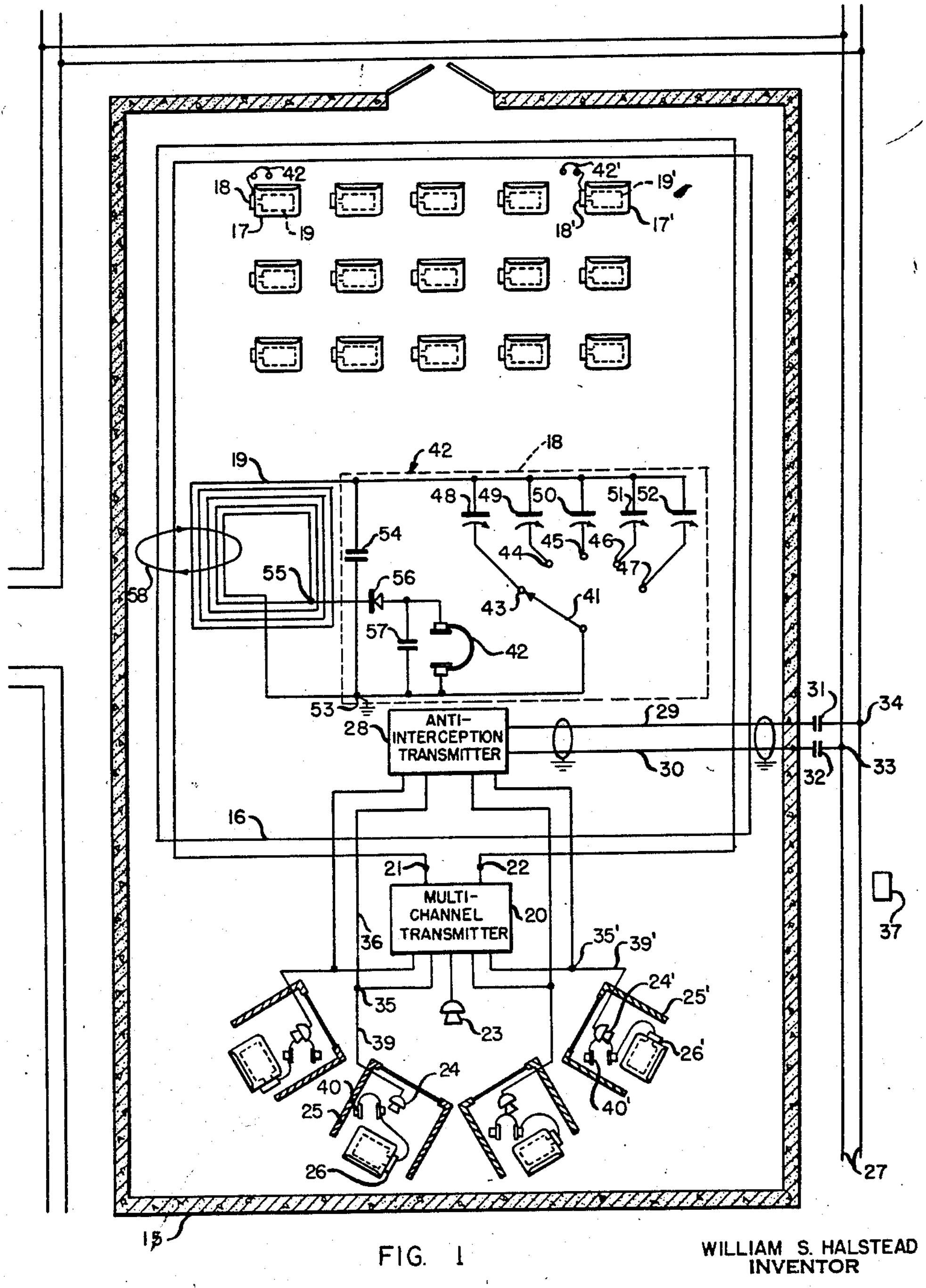
Fig. 1 is a combination pictorial representation of the system in conjunction with a partial schematic wiring diagram thereof and particularly of one preferred form of induction radio receiver of a non-vacuum tube type.

Referring to the drawings and more particularly to Fig. 1, there is shown schematically an auditorium area 15, having a signal emanating means 16 in the form of a horizontal loop disposed within the auditorium area and embracing a seating area, consisting of seats 17, having an induction radio receiver 18, and a horizontal loop 19 (shown dotted) connected to the radio receiver on each of the seats. A headphone unit, such as 42, is associated with each chair receiver. A multi-channel radio carrier transmitter 20, or equivalent group of single-channel transmitters, has its output connected to terminals 21 and 22, which terminals are connected to the ends of the signal emanating means, such as transmitting loop 16. A master microphone 23 is connnected to the multi-channel transmitter 20, and secondary microphones, such as 24 and 24' are located in individual soundproof booths 25 and 25', as shown, each of said microphones 24 and 24' being connected to their respective input circuits of multi-channel transmitter 20. An induction radio receiver 26, termed a secondary receiver since it is associated with a secondary microphone, such as 24, is located in each of the soundproof booths. While the secondary receivers, such as 26, are shown outside of the signal emanating means 16, it is to be understood that the signal emanating means may be disposed to embrace the area wherein the secondary receivers are located in the soundproof booths 25, and that the secondary receivers 26 are within the effective signaling range of the signals impressed upon the signal emanating means, or transmitting loop 16.

Conductors 27 represent conventional electric-light and power wiring within the building, of which the auditorium area 15 is a part. It is to be understood that the conductors 27 may be any conventional electric light or power wiring which would ordinarily be used in an auditorium, theatre, general assembly room or the like, and need not be specially installed for application with the present invention. An anti-interception transmitter 28 is shown having its output connected to R. F. transmission line conductors 29 and 30, which are connected to one side of condensers 31 and 32, the other side of said condensers being connected to the terminals 33 and 34, which are connected to the conductors 27.

Junctions 35 and 35', and conductors 36 and 36', respectively, are employed to connect the input circuits of multi-channel transmitter 20 and the input circuits of the anti-interception transmitter 28 to conductors 39 and 39', respectively, which are connected with the secondary microphones 24 and 24', respectively.

The anti-interception transmitter may transmit a group of carrier-wave frequencies substantially the same as those of multi-channel transmitter 20, or a carrier wave having a varying frequency which sweeps through all the frequencies used by multi-channel transmitter 20. These anti-interception frequencies are impressed upon the conductors 27 through R. F. coupling condensers 31 and 32, and will mutilate the signals from transmitter 20 at receiving points outside of the conference room area 15, as will be described in further detail in subsequent paragraphs. The master microphone 23 and the secondary microphones, such as 24 and 24', will each be used to modulate one channel of the multi-channel transmitter 20 and simultaneously modulate all channels of the anti-interception transmitter 28.

The operation of the multi-channel transmitter 20 is such that a speaker using the microphone 23 will cause his voice to modulate a designated channel of the transmitter 20 or selected group of channels of transmitter 20 whose output circuit is connected to the transmitting loop 16. The chair receivers, such as 18 and 18', located within the confines of the transmitting loop 16, and the secondary receivers 26 and 26' which may also be located within the range of the induction field of transmitting loop 16, will be able to receive, with maximum effectiveness, signals impressed upon the transmitting loop by the multi-channel transmitter 20, thus enabling the speaker to have his voice carried to listeners in the general seating area who employ the radio receivers, such as 18 and 18'. One or more persons, in an illustrative application of the system of the invention, may act as a translator and be located in each of the booths, such as 25 and 25'. The translators may listen through the headphones 40 and 40' of the secondary receivers 26 and 26', respectively, and hear the voice of the speaker which is impressed upon the master microphone 23. Assuming that the person using the master microphone 23 is speaking in French, the translator located in the booth 25, for example, will hear the speech of the speaker in his headphone 40. The translator may then translate the language of the speaker at the master microphone into another tongue, for instance English and, utilizing the English language, speak into the secondary microphone 24. His voice will modulate one of the channels in the multi-channel 20 and also modulate all channels of the anti-interception transmitter 28. The translators in each of the other booths, such as 25', may use the same procedure as the first translator, but may speak into their respective secondary microphones, such as 24', in different languages, for instance, in Chinese, Russian and Spanish. Their voices will then each modulate one channel of the multi-channel transmitter and all channels of the anti-interception transmitter 28.

It will therefore be seen that while the speaker at the master microphone 23 may have his voice heard by means of individual radio receivers, such as 18 and 18', it will also be possible for the listener at the radio receiver 18, for example, to receive the voice of any of the translators by utilizing a channel selector switch 41, in the illustrative receiver 18. The arm of selector switch 41, in the illustrative example, is of rotary step type and may be connected to any of the contacts, such as 43, 44, 45, 46 or 47, each of which has a pre-set adjustable trimming condenser, such as 48, 49, 50, 51 and 52, connected respectively therewith. The receiver loop 19 is connected to one side of loop tuning condenser 54 and ground terminal 53 of the receiver 18, with a tap 55, at a position several turns from the lower end of the loop, to connect the first several turns of the loop to one side of the crystal diode detector 56 in effecting a proper impedance match and improved selectivity. The headphones 42 are connected between the other side of the crystal diode detector 56 and the ground terminal 53, to which the arm of switch 41 is connected. An R. F. by-pass condenser 57 is shunted across the headphones 42 in conventional manner. By movement of the arm of selector switch 41 to any of the terminals 43 through 47, any receiving channel may be activated by the insertion of the proper tuning condensers 48 through 52. While adjustable trimming condensers are specifically shown in the circuit for resonating the loop circuit at each of the specific transmitting channels, it is to be understood that any suitable tuning circuit may be used in lieu of that shown in Fig. 1.

The electromagnetic field 58 surrounding the conductors of loop 16 is utilized in transferring signal energy between the transmitting loop 16 and the receiver loop 19. While much of the signal energy from the multi-channel transmitter 20 is concentrated within the confines of the transmitting loop 16, it will be apparent that signals will emanate from the transmitting loop outside of said loop, and consequently, outside of the auditorium. To reduce the possibility of interception of intelligible radio signals beyond the confines of the auditorium, all channels of the anti-interception transmitter 28 are modulated simultaneously by the voices of the several translators using the microphones 24. A receiver 37 located on the outside of the auditorium, as shown in the diagram of Fig. 1, will, by virtue of its greater proximity to electric power lines 27 than to the transmitting loop 16 and because of the partial shielding effect of the wall of the auditorium area 15, respond principally to the "jamming" signals from the anti-interception transmitter, operating on the same carrier frequencies employed by the transmitter 20. Consequently, the relatively weak signal emanating from the transmitting loop 16 beyond the confines of the auditorium will be dominated by the stronger signal impressed upon the outside power lines, such as 27 and will be so mutilated by the simultaneous presence of all the voices of the translators as to be unintelligible.

A receiver, such as 18, disposed within the auditorium area 15 and having a horizontal loop antenna 19 will be responsive, in an effective manner, only to the intense concentrated electromagnetic field produced within loop 16, and will not respond in an effective manner to the relatively weak interfering signal produced by the anti-interception transmitter 28 and its associated power line conductors 27 on the outside of the auditorium area. Further discrimination between the desired signals from transmitting loop 16 and those from power line conductors 27 is provided by the horizontal disposition of the receiving loop 19. The horizontal loop 19 will provide a maximum signal from carrier energy impressed on horizontal transmitting loop 16 and a minimum signal from carrier energy impressed on power lines 27. That is, with a given loop receiving antenna, such as 19, the strongest signal will be received from horizontal transmitting loop 16, at a point within the loop, when the receiving loop 19 is disposed in a horizontal plane. The same receiving loop 19 will provide the strongest signal from carrier energy impressed on power-line conductors 27 when the receiving loop 19 is disposed in the vicinity of power conductors 27 and in a vertical plane. Thus, by virtue of the considerable differential which exists between the intensity of signaling fields produced respectively by the horizontal transmitting loop 16 and the power lines 27, and by virtue of the horizontal disposition of the receiving loop 19, which is responsive in an optimum manner to the signaling field produced by horizontal transmitting loop 19, a great degree of discrimination is produced between the two signals at points within the transmitting loop. On the outside of transmitting loop 16, however, it has been observed that a loop receiving antenna must be inclined at an angle with respect to the horizontal plane of the transmitting loop 16, and as the distance increases between the receiving loop and transmitting loop 16, the angular disposition of the receiving loop approaches a vertical plane. Thus, on the outside of the seating area 15, the degree of planar discrimination, which is an important factor when the receiver is within transmitting loop 16, becomes relatively insignificant, thereby rendering it more difficult to intercept intelligible signals at points external to the seating area.

While one form of signal mutilation is presented herein, it is to be understood that any other conventional form of signal mutilation or "jamming" may be employed.

Figure 2:
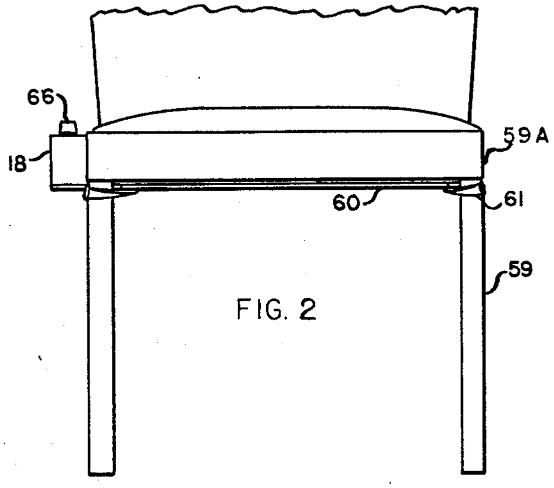
Fig. 2 is a partial front elevational view of a representative chair with a radio receiver and loop-structure housing connected thereto.

Referring to Fig. 2, a front elevational view of a chair 59 illustrates that a loop-structure housing 60, with flexible straps, such as 61, secured thereto, is mounted in a horizontal position beneath the seat 59A of the chair 59. A radio receiver, termed a tuning head 18, is secured to the loop structure housing and is held at the side of the seat 59A, with tuning control 66 in a vertically-disposed position accessible to the occupant of the chair.

Figure 3:
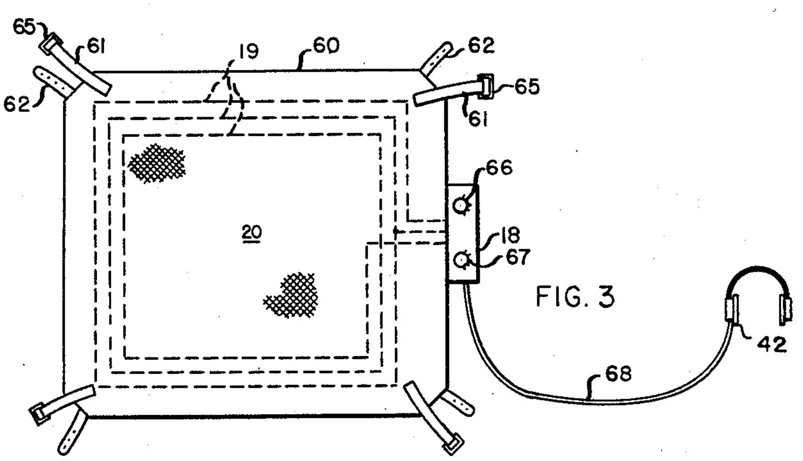
Fig. 3 is a plan view of the loop-structure housing and integral radio receiver having means for securing and positioning same to a chair, with tuning controls at the side of the seat thereof.

Fig. 3 shows a top view of the loop-structure housing 60, having the metallic loop 19 as a part thereof. The metallic loop may be disposed on one surface of the loop structure housing or may be disposed between two layers or sheets of suitable non-conducting material. The flexible straps 61 have buckles 65 or other fastening means of any well-known type on one end thereof, with the other end thereof being secured to the loop-structure housing. Flexible straps 62, in the illustrative arrangement, have perforations therein and are used to engage the buckles 65 of the straps 61 for positioning and securing the loop-structure housing on the legs of the chair below the seat, as shown in Fig. 2. The tuning head 18 is attached to loop-structure housing 60 at one side thereof, and includes channel selector control knob 66 and volume control knob 67. A headphone 42 is connected to the tuning head 18 by means of cord 68.

Figure 4:
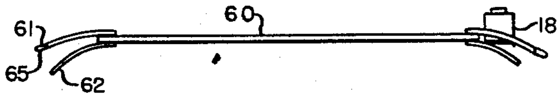
Fig. 4 is a front view of a loop structure housing as set forth in Fig. 3.

Fig. 4 shows, in side view, the loop-structure housing 60 with tuning head 18 as a unitary member and, as shown in Fig. 3, the loop is a part thereof. It will be seen from Figs. 2 and 3 that the control knobs 66 and 67, when the radio receiver is in position on a chair for use by the occupant of the chair, may be easily reached by the right hand of the chair occupant. It will be observed by reference to the various views of the chair receiver, as shown in Figures 2–4, that by utilizing the straps 61 and 62, it will be seen that the loop-structure housing 60 with its associated tuning head 18 may be placed beneath the seat of a chair and may be positioned any distance below the seat by adjusting the straps at the proper height on the legs, from the floor.

Figure 5:
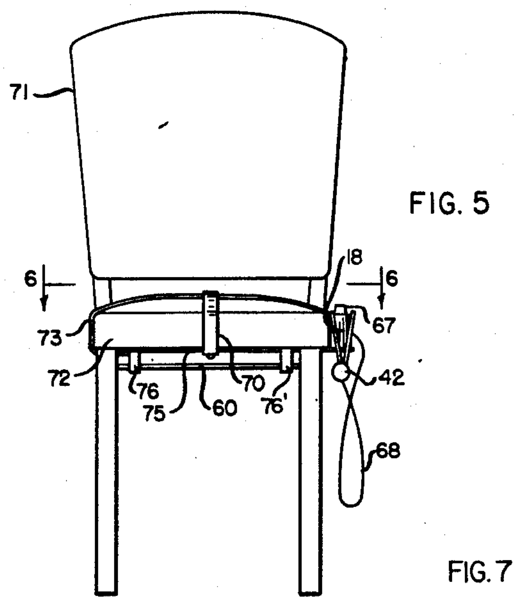
Fig. 5 is a modification of the loop-structure housing and securing means for disposing and securing said housing below the seat of the chair and spaced therefrom, with means for positioning the loop housing for maximum signal reception in relation to the horizontal transmitting loop.

Fig. 5 shows a chair 71 having a seat portion 72. A loop structure housing 60, similar to that of Figs. 3 and 4, has straps 76 and 76' connected thereto, with one end attached to the loop-structure housing and the other end attached to a flat loop-structure supporting member 75. Thus the two straps 76 and 76', in addition to straps 77, Fig. 7, hold the loop-structure housing suspended beneath the loop supporting member 75. The loop supporting member has elastic straps, such as 70 and 73 which are adapted to go across the top of the seat 72 of chair 71 and may be connected to the opposing sides of the loop supporting member 75. The tuning head 18, similar to that of Figs. 2–4, is shown with the control knobs, such as 67, at the left side of the chair, as observed by the occupant, with the headphones 42 connected by a cord 68, to the tuning head.

Figures 6, 8:
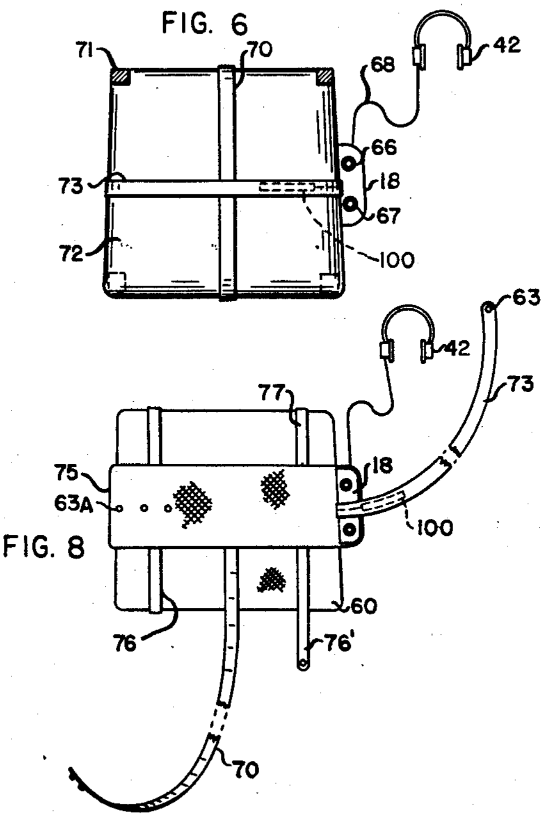
Fig. 6 is a plan view taken along lines 6—6 of Fig. 5 showing a portion of the loop-structure housing supporting and securing means, with the radio receiver or tuning head disposed on one side thereof, to be easily reached by the occupant of the chair.
Fig. 8 is a plan view of Fig. 7, more clearly showing the loop-structure supporting member having the radio receiver secured thereto, and also having thereon the means for securing the loop structure supporting member to the chair and for positioning the loop-structure housing in relation to the loop-structure supporting member.

Fig. 6 is a top view of the seat 72 illustrated in Fig. 5, showing the tuning head 18 and straps 70 and 73 positioned for use on the chair 71. The straps 73 and 70 are shown disposed across the upper surface of the seat 72, to hold the tuning head 18 and its complemental loop members, such as 75 and 60, Fig. 5, in position for use on the chair. The headphones and headphone cord, 42 and 68 respectively are shown connected to the tuning head 18. A pressure-actuated battery switch 100 of any well-known flat type may be disposed in strap 73, as indicated by dotted lines, to operate with a modified form of chair receiver in which one or more vacuum tubes may be used, as will be described hereinafter. It is obvious that disposition of the pressure switch in this manner on strap 73 may cause the switch to close when a person occupies the chair, and to open when he rises from the chair, thus automatically disconnecting battery power from the vacuum tube or tubes which may be utilized, in some instances, in the chair receiver.

Figure 7:
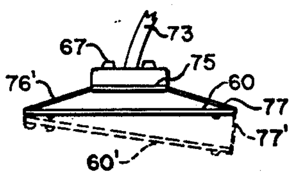
Fig. 7 is a side view of the loop-structure housing shown in Fig. 6, said loop-structure housing being angularly disposable in a vertical plane by an adjustable loop-structure supporting member which carries the radio receiver and the means for securing the loop-structure supporting member to the chair.

Fig. 7 shows in side elevation the loop-structure supporting member 75 with a portion of the strap 73 being secured thereto. The straps 76' and 77 are shown having one end secured to the loop-structure support 75, with the other ends thereof being secured to the loop structure housing 60. The straps 76' or 77 may be adjusted in length, as shown by the dotted lines in order that the loop-structure housing 60 may be moved angularly in a vertical plane with respect to the horizontal position of the loop-structure support 75 for increasing the dielectric space between the loop and metallic elements which may be in the seat 72, or to minimize the effect of body capacity which in some instances may exist between the body of the occupant of the chair and the loop per se; proper angular disposition of the loop-structure housing 60 also is important to effect maximum signal pickup by the loop when located at certain points within the auditorium area where the normal horizontal disposition of the loop does not produce the optimum signal strength at the receiver.

Fig. 8 illustrates in further detail the general arrangement of the chair receiver of Fig. 7 and shows the loop-structure support 75 having the tuning head 18 secured thereto, with the loop-structure housing 60 suspended from the loop structure support 75 by the straps, such as 76, 76' and 77. A snap fastener 63, of any well-known type is disposed at one end of strap 73, and a coacting fastener means 63A is shown on loop-supporting member 75 to permit ease of installation or removal of the chair receiver from seat 72.

Figure 9:
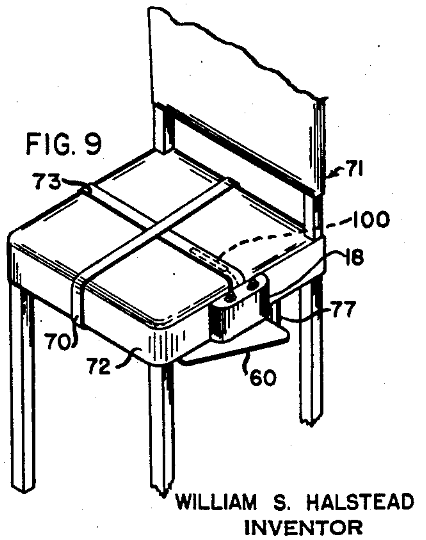
Fig. 9 is a partial perspective view of a chair showing the loop-structure housing angularly disposed in relation to the loop structure supporting member which is substantially parallel with the horizontal portion of the chair seat.

Fig. 9 shows a perspective view of the chair receiver and its complemental parts positioned for use on the chair by the occupant thereof. The loop structure housing 60 is shown angularly disposed beneath the seat 72 of the chair 71, in much the same manner as the loop-structure housing is inclined as shown by the dotted lines 60' in Fig. 7.

Figure 10:
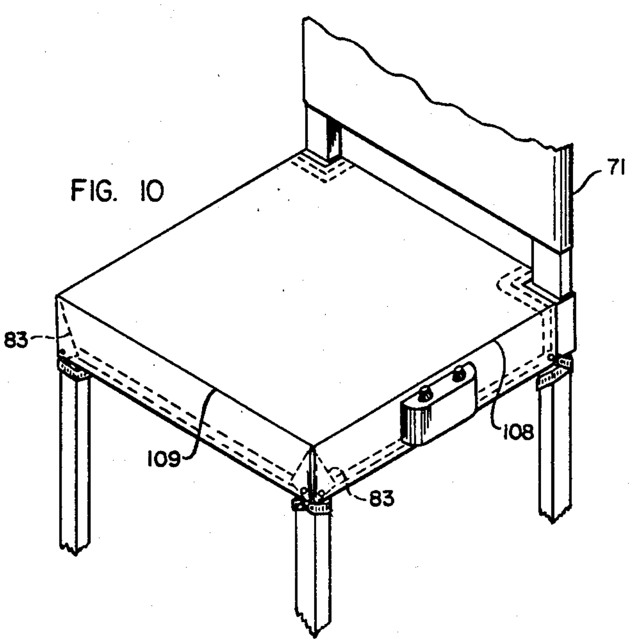
Fig. 10 is a perspective view of a modification of the loop-structure housing wherein said housing is a part of a flexible cover for the chair seat and fits on the upper surface of said chair seat, with securing means for holding the loop-structure housing in position on the seat of a chair, with the tuning head disposed at one side of the housing.
Figure 11:
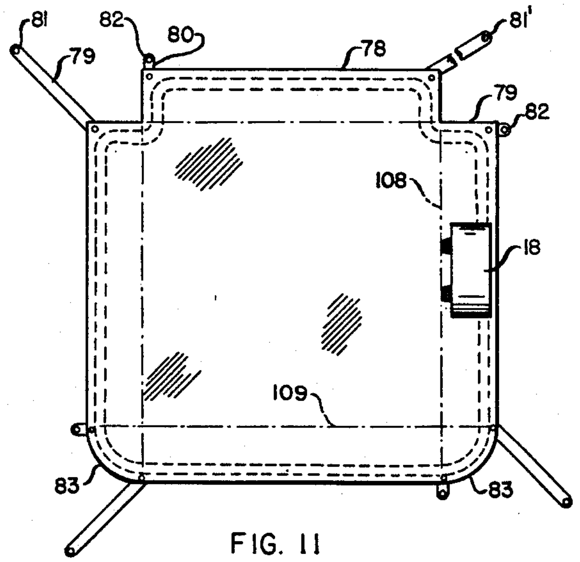
Fig. 11 is a plan view of the flexible loop-structure housing shown in Fig. 10, said loop-structure housing having cut-away portions for fitting on the particular chair to be used, with the radio receiver secured to the flexible loop-structure housing at one side thereof.

Figs. 10 and 11 show modifications of a flexible loop-structure housing 78, in slip-cover form, which has cut-away corners 79 to better adapt the medium to fit over the seat of the chair. The tuning head 18 is secured to one edge of loop-supporting structure 78 and forms a part thereof. In Fig. 11, the flexible loop-structure housing 78 is shown in extended plan view before it is secured to the chair seat. Straps 79 and 80 each have one end thereof secured at corners of the flexible loop-structure housing, and snap-fastening members 81 and 82 are secured to the straps 79 and 80, respectively, and are used for positioning and securing the flexible loop-structure housing 78 as a seat cover on the chair 71. When the flexible loop-structure housing is secured to the chair, the area indicated by 83 is folded as shown in Figs. 10 and 11 to form a tight fitting cover on the upper surface of the chair seat, with the folds 108 and 109 forming a dividing line between the horizontal and vertical sections of the cover.

While straps with buckles or snap-fasteners are shown in several of the views for positioning the loop-structure housing to the loop structure support, it is to be understood that any other method or means of indicating or positioning the several members in relation to one another may be utilized.

Figure 12:
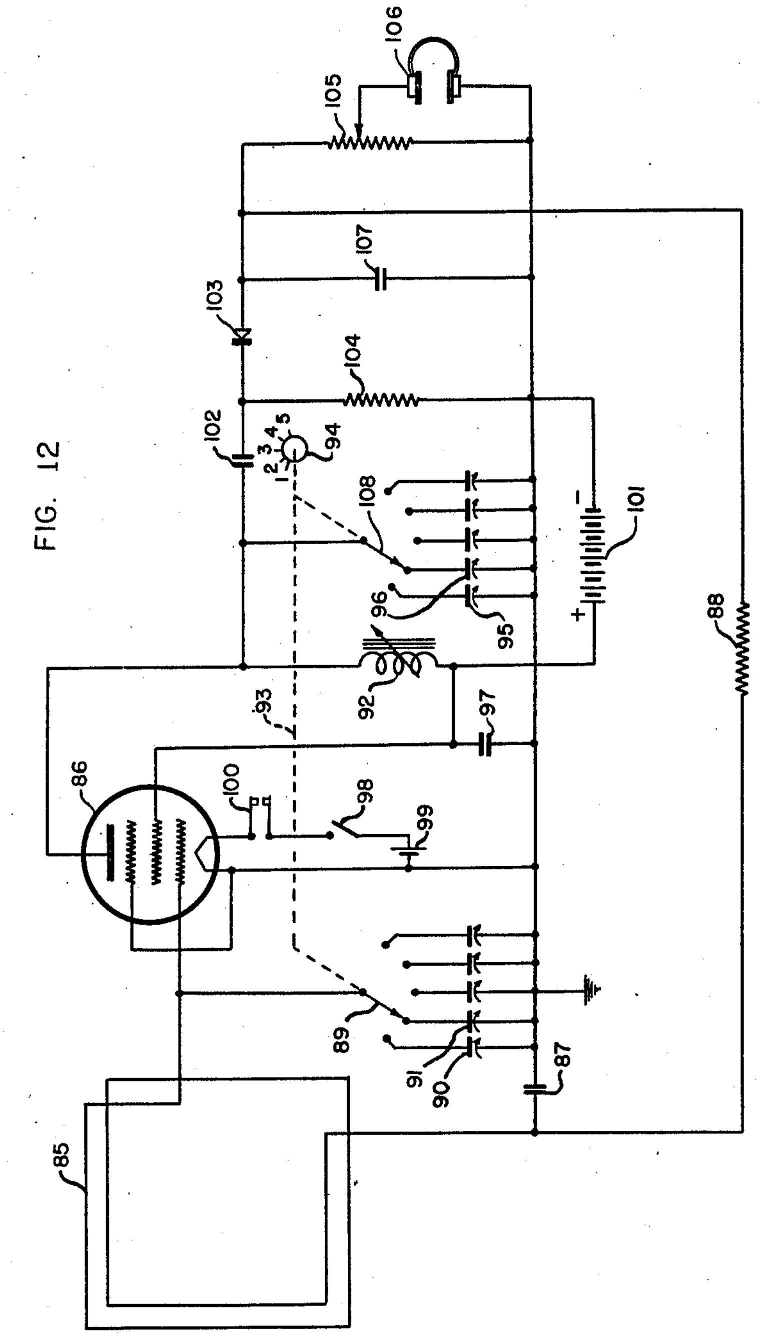
Fig. 12 is a schematic wiring diagram of one preferred form of induction radio receiver employing a vacuum tube and a crystal to attain greater sensitivity than is provided by the non-vacuum tube receiver of Figure 1.

One preferred form of illustrative induction radio receiver, incorporating a vacuum tube radio frequency amplifier and crystal diode detector, suitable for use with the system described herein, is shown in Figure 12. In this receiver circuit, one terminal of loop antenna 85, which may be wound on a fibre board or other suitable form to be mounted beneath the seat of a chair, as shown in Figs. 2 and 3, is connected as shown to the control grid of vacuum tube 86, employed as a tuned radio-frequency amplifier. The other terminal of the loop 85 is connected through condenser 87, to ground and to one side of automatic volume-control resistor 88, utilized in automatic volume control functions as will be described hereinafter. Tuning of the loop circuit is accomplished by means of selector switch 89 and associated capacitors such as 90 and 91. In the illustrative arrangement, a multi-position rotary switch is utilized together with five adjustable condensers, such as 90 and 91, to effect tuning of the loop circuit to any one of five predesignated carrier frequencies, employed by the illustrative communication system described herein. Tuning of the output circuit of vacuum tube 86 is accomplished by means of a variable-permeability inductor 92 and associated capacitor selection switch 108, the arm of which is joined with the arm of switch 89 by means of a common shaft 93, to which a tuning, or channel selector knob 94 is affixed. Preset adjustable condensers, such as 95 and 96 are utilized in connection with switch 108, to effect tuning of the output circuit of R. F. amplifier tube 86 to the desired carrier frequency, in step with the tuning of the loop circuit without individual adjustment of each tuning switch. Plate-supply by-pass condenser 97 is connected between the positive side of the plate battery and ground as shown. A manually-operated switch 98 is employed to disconnect battery 99 from the filament of vacuum tube 86 when the set is not in use. A second switch 100, of pressure-actuated type and of substantially flat construction, in series with manually-controlled switch 98 may be utilized as a part of the chair receiver structure, as explained in preceding paragraphs, to automatically disconnect the filament from the battery 99 when the seat is not occupied. This prevents accidental discharge of the battery 99 during periods when the seat is not occupied and when a former occupant might have neglected to open switch 98 upon leaving the chair.

It is pointed out in this connection that an automatic body-actuated switch of the type described herein is of practical importance since it is assumed that large numbers of chair receivers will be utilized in auditoriums, convention rooms, theatres, and the like, which would otherwise present a problem of conservation of battery life were not some automatic means provided to disconnect the battery from the filament of vacuum tube 86, when the equipment is not in use. It is also pointed out that the disconnection of the filament battery 99, from vacuum tube 86, also effects suspension of current flow from the plate battery 101, thus conserving the life of both the filament and plate batteries when switch 100 or 98 is open.

Radio-frequency signal energy, at the selected carrier frequency, is conveyed from the plate circuit of vacuum tube 86, through radio-frequency coupling condenser 102, to one side of a crystal diode detector 103. Resistor 104 is also connected between the input side of diode detector 103, as shown. The output side of the diode detector 103 is connected to one side of volume-control potentiometer 105, the movable arm of which is applied to earphones 106 or other suitable transducer, as shown. The other side of potentiometer 105 is connected to ground, as indicated. Radio-frequency by-pass condenser 107 is connected between the output side of crystal diode 103 and ground, as illustrated. In order to provide automatic volume control, a portion of the rectified signal energy is applied through resistor 88, to one side of loop antenna 85, as shown. Thus, rectified grid bias voltage, the value of which is proportional to the strength of the received carrier signal, is supplied through the winding of loop 85, to the control grid of vacuum tube 86, without requirement of a vacuum tube rectifier for the automatic volume control function as is customarily employed in conventional radio receivers. While the illustrative receiver utilizes a single vacuum tube, it is obvious that more than one vacuum tube may be utilized in the receiver as described above for obtaining a greater receiver sensitivity or increased radio output voltage in the earphones without altering the functional arrangement of the crystal diode detector and associated circuit.

What is claimed as new and desired to be secured by Letters Patent of the United States, is:

1. In a system for transmission of electrical signal energy to individuals within a selected seating area, the combination of a signal emitting means disposed adjacent a seating area, said signal emitting means being positioned to produce maximum signal intensity within said seating area, having a plurality of chairs therein, a carrier wave transmitter electrically connected to said signal emitting means, means for modulating said carrier wave transmitter by audio-frequency signal energy corresponding to sounds addressed to occupants of said seating area, at least one carrier wave receiver disposed within said seating area, said receiver having an antenna structure removably disposed on at least one chair in said seating area, means for positioning said antenna structure to effect maximum signal pickup from said signal emitting means, a tuning head associated with said antenna structure and being a part thereof, said tuning head having a tuning means, a carrier rectifier, tuning and volume controls, means for removably mounting said tuning head on said chair with said tuning and volume controls in a position accessible to the occupant of said chair, and a transducer connected to said tuning head for use by the occupant of said chair to permit individual reception of said audio frequency signal energy.

2. An inductive-carrier group communications system of restricted-range type, comprising in combination a horizontal transmitting loop disposed substantially around the periphery of a selected seating area, a carrier transmitter electrically connected with said loop, means for modulating said carrier transmitter by audio frequency signal energy, a plurality of receiving loop structures disposed in a substantially horizontal position beneath the seats of chairs within said seating area, each of said chairs having a loop structure provided with means thereon for removably supporting it in a position of maximum signal pickup with respect to signal energy emitted by said horizontal transmitting loop, said loop structure also having means for providing an air-dielectric spacing between said receiving loops and the seats of said chairs to minimize the absorptive effect thereof, an inductive carrier tuning head structurally associated with each of said receiving loops, said tuning head including a carrier rectifier, tuning and volume control, said tuning head also having means for supporting it in position at the side of the seat of each of said chairs with said controls in a substantially upright position, accessible to the occupant of said chair, and a transducer connected to said receiver for individual use by an occupant of said chair.

3. An inductive-carrier group-communications system of restricted-range type, comprising in combination a horizontal transmitting loop disposed substantially around the periphery of a selected seating area, a carrier transmitter electrically connected with said loop, means for modulating said carrier transmitter by audio frequency signal energy, a plurality of chairs within said seating area, a receiving loop structure disposed in a substantially horizontal position beneath the seat of at least one chair within said seating area, said loop structure having means thereon for removably supporting it in a position of maximum signal pickup with respect to signal energy emitted by said horizontal transmitting loop, said loop structure also having means for providing an air-dielectric spacing between said receiving loop and the seat of said chair to minimize the absorptive effect thereof, an inductive carrier tuning head structural associated with said receiving loop, said tuning head including a carrier rectifier, tuning and volume control, said tuning head also having means for supporting it in position at the side of the seat of said chair with said controls accessible to the occupant of said chair and a transducer connected to said receiver for individual use by an occupant of said chair.

4. In an inductive carrier system for transmission of signal energy to individuals within a selected seating area, the combination of a horizontal transmitting loop disposed substantially about a seating area, having a plurality of chairs therein, a carrier transmitter electrically connected to said transmitting loop, means for modulating said carrier transmitter by audio-frequency signal energy corresponding to sounds addressed to occupants of said seating area, a plurality of carrier receivers disposed within said seating area, each of said receivers having a loop antenna structure removably disposed within the leg structure area of each of said chairs, means for positioning each of said loop antenna structures beneath the seat of each of said chairs, and in a substantially horizontal plane, means for maintaining sufficient air-dielectric spacing between the bottom of each of said chairs and each of said loops to restrict absorption of carrier signal energy by said seat, a tuning head associated with said loop structure and secured thereto, said tuning head having a tuning means, a carrier rectifier, tuning and volume controls, said tuning head being disposable in a position accessible to the occupant of said chair, and a transducer connected to said tuning head for use by the occupant of said chair to permit individual reception of said audio-frequency signal energy.

5. In an inductive carrier system for transmission of signal energy to individuals within a selected seating area, the combination of a horizontal transmitting loop disposed substantially about a seating area, having a plurality of chairs therein, a carrier transmitter electrically connected to said transmitting loop, means for modulating said carrier transmitter by audio-frequency signal energy corresponding to sounds addressed to occupants of said seating area, a plurality of carrier receivers having a loop antenna structure removably disposed within the leg structure area of each of said chairs, means for positioning each of said loop antenna structures beneath the seat of each of said chairs, and in a plane substantially parallel to said seat, means for maintaining sufficient air-dielectric spacing between the bottom of each of said chairs and each of said loops to restrict absorption of carrier signal energy by each of said seats, a tuning head associated with each of said loop structures, said tuning head having a tuning means, a carrier rectifier, tuning and volume controls, means for removably mounting each of said tuning heads at the side of each of said chairs with said tuning and volume controls in a position accessible to the occupant of each of said chairs, and a transducer connected to each of said tuning heads for use by the occupant of each of said chairs to permit individual reception of said audio frequency signal energy.

6. In an inductive carrier system for transmission of audio frequency signal energy to individuals within a selected seating area, the combination of a horizontal transmitting loop disposed substantially about a seating area, a carrier transmitter electrically connected to said transmitting loop, means for modulating said carrier transmitter by audio-frequency signal energy corresponding to sounds addressed to occupants of said seating area, a plurality of carrier receivers disposed within said seating area, each of said receivers having a loop antenna structure removably disposed between the legs of each of said chairs, means for positioning each of said loop antenna structures beneath the seat of each of said chairs, means for maintaining sufficient air-dielectric spacing between the bottom of each of said chairs and each of said loops to restrict absorption of carrier signal energy by said seat, a tuning head associated with said loop structure, said tuning head having a tuning means, a carrier rectifier, tuning and volume controls; means for removably mounting said tuning head at the side of said chair with said tuning and volume controls in an upwardly-disposed position accessible to the occupant of said chair, and an earphone connected to said tuning head for use by the occupant of said chair to permit individual reception of said audio frequency signal energy.

7. An inductive-carrier group communications system of restricted-range type, comprising in combination a horizontal transmitting loop disposed substantially around the periphery of a selected seating area, a carrier transmitter electrically connected with said loop, means for modulating said carrier transmitter by audio frequency signal energy, a plurality of receiving loop structures disposed in a substantially horizontal position beneath the seats of chairs within said seating area, said loop structures having means thereon for removably supporting them in a position of maximum signal pickup with respect to signal energy emitted by said horizontal transmitting loop, said loop structure also having means for providing an air-dielectric spacing between said receiving loops and the seats of said chairs, a receiver having a tuning head structurally associated with each of said receiving loops, including a carrier rectifier, tuning and volume control, said tuning head having means for supporting it in position at the side of the seat of each of said chairs with said controls in a substantially upright position, and an earphone connected to said receiver for individual use by an occupant of said chair.

8. In a simultaneous translation system of radio-signal distribution type, a first speaker's microphone, a carrier-wave transmitter, means for modulating said carrier-wave transmitter by audio frequency energy from said first speaker's microphone, a transmitting loop antenna disposed around an auditorium area in which said speaker's microphone is located, at least one translator's microphone for converting a spoken translation of the speech entering said speaker's microphone into audio frequency signal energy, a second carrier wave transmitter, means for individually modulating said second transmitter by said audio frequency signal energy from said translator's microphone, means for impressing carrier wave energy from said second carrier wave transmitter at a carrier frequency different from that of said first transmitter upon said loop antenna, a radio receiver disposed on at least one chair within said auditorium area, said receiver having a loop antenna positioned in a plane parallel to that of said transmitting loop antenna and mountable beneath the seat of said chair, a tuning head also forming a part of said receiver and being disposed adjacent said loop antenna, means for supporting said tuning head at the side of said chair adjacent the seat thereof, means on said tuning head for making said receiver selectively responsive to carrier signals from either said first mentioned transmitter or said second mentioned transmitter as determined by the occupant of said chair, and a transducer attached to the output of said receiver for individually conveying to the occupant of said chair audio frequency energy corresponding to speech impinging on said first speaker's microphone or to speech impinging on said translator's microphone.

9. A receiver for induction radio communicating systems comprising in combination, a multi-turn loop antenna, a housing therefor, a tuning head disposed on one edge of said loop housing, and carried thereby, said tuning head including a carrier-frequency discriminating means, a carrier wave detector, and a volume control, a headphone connected to said tuning head and responsive to the signal output thereof, circuit means for connecting said detector and said headphone in series across a portion of said multi-turn loop, and for connecting said frequency-discriminating means across the whole of said loop to improve the selective response thereof, and means for positioning said loop housing beneath the seat of a chair with said tuning head adjacent the seat thereof and having said frequency discriminating means and said volume control upwardly disposed on said tuning head to facilitate the use thereof by an occupant of said chair.

10. An induction radio receiver for use on chairs in seating areas served by an inductive carrier communications system, comprising in combination a multi-turn loop antenna, a pair of non-conducting sheet members positioned at either side of said loop antenna and forming a protective housing therefor, a tuning head mounted on one or both of said sheet members and at one edge thereof, said tuning head including a loop tuning means and a crystal diode detector, a headphone connected to said tuning head and responsive to the output thereof, circuit means for electrically connecting said loop tuning means across all turns of said loop antenna, circuit means for electrically connecting said crystal diode detector and said headphone in series across a small portion of said loop antenna and at the ground end thereof, and adjustable supporting means disposed on said sheet members adaptable for mounting said sheet members beneath the seat of a chair and for supporting said tuning head at the side of the seat of said chair in an accessible position for the occupant thereof.

WILLIAM S. HALSTEAD.

REFERENCES CITED

The following references are of record in the file of this patent:

UNITED STATES PATENTS

| Number | Name | Date |
|---|---|---|
| 1,864,615 | Quinby | June 28, 1932 |
| 1,874,480 | Filene | Aug. 30, 1932 |
| 1,931,236 | Nicolson | Oct. 17, 1933 |
| 2,122,145 | Kear et al. | June 28, 1938 |
| 2,138,894 | Ware | Dec. 6, 1938 |
| 2,252,641 | Poliakoff et al. | Aug. 12, 1941 |
| 2,279,031 | Cockerell et al. | Apr. 7, 1942 |
| 2,362,692 | Goldberg et al. | Nov. 14, 1944 |

FOREIGN PATENTS

| Number | Country | Date |
|---|---|---|
| 414,560 | Great Britain | Aug. 9, 1934 |